US008518590B2

(12) United States Patent
Sugiura et al.

(10) Patent No.: US 8,518,590 B2
(45) Date of Patent: Aug. 27, 2013

(54) FUEL CELL OUTPUT CHARACTERISTIC ESTIMATION APPARATUS AND OUTPUT CHARACTERISTIC ESTIMATION METHOD, FUEL CELL SYSTEM AND VEHICLE HAVING THE SAME, AND FUEL CELL OUTPUT CONTROL METHOD AND DATA STORAGE MEDIUM

(75) Inventors: Hiroshi Sugiura, Kariya (JP); Nobuo Watanabe, Toyota (JP); Kouta Manabe, Gold River, CA (US); Tetsuhiro Ishikawa, Nishikamo-gun (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 571 days.

(21) Appl. No.: 12/690,417

(22) Filed: Jan. 20, 2010

(65) Prior Publication Data

US 2010/0119900 A1    May 13, 2010

Related U.S. Application Data

(62) Division of application No. 12/140,737, filed on Jun. 17, 2008, which is a division of application No. 09/990,264, filed on Nov. 23, 2001, now abandoned.

(30) Foreign Application Priority Data

Nov. 28, 2000 (JP) .................................. 2000-361076
Sep. 13, 2001 (JP) .................................. 2001-278724

(51) Int. Cl.
*H01M 8/04* (2006.01)
(52) U.S. Cl.
USPC ........... 429/428; 429/427; 429/430; 429/431; 429/432

(58) Field of Classification Search
None
See application file for complete search history.

(56) References Cited

U.S. PATENT DOCUMENTS

| 4,839,246 A | 6/1989 | Takabayashi |
| 5,290,641 A * | 3/1994 | Harashima ...................... 429/17 |
| 6,519,539 B1 | 2/2003 | Freeman et al. |

FOREIGN PATENT DOCUMENTS

| EP | 0716463 | 6/1996 |
| EP | 0993060 | 4/2000 |
| JP | 60-107270 | 6/1985 |
| JP | 3-80316 | 4/1991 |
| JP | 4-58463 | 2/1992 |
| JP | 07105964 | 4/1995 |
| JP | 7-123609 | 5/1995 |
| JP | 11-067253 | 3/1999 |
| JP | 11-195423 | 7/1999 |
| JP | 2000-12059 | 1/2000 |

OTHER PUBLICATIONS

Notification of Reason(s) for Refusal issued Oct. 25, 2011 in Japanese Patent Application No. 2001-278724 (with partial English translation).

* cited by examiner

*Primary Examiner* — Barbara Gilliam
*Assistant Examiner* — Angela Martin
(74) *Attorney, Agent, or Firm* — Oblon, Spivak, McClelland, Maier & Neustadt, L.L.P.

(57) ABSTRACT

An output characteristic of a fuel cell is estimated by detecting an output current of the fuel cell and a voltage between terminals of the fuel cell, and then estimating the output characteristic of the fuel cell on the basis of the detected output current and the detected voltage between the terminals, and a basic output characteristic of the fuel cell.

6 Claims, 11 Drawing Sheets

FUEL CELL OUTPUT CHARACTERISTIC ESTIMATION APPARATUS AND OUTPUT CHARACTERISTIC ESTIMATION METHOD, FUEL CELL SYSTEM AND VEHICLE HAVING THE SAME, AND FUEL CELL OUTPUT CONTROL METHOD AND DATA STORAGE MEDIUM

INCORPORATION BY REFERENCE

The disclosure of Japanese Patent Application No. 2000-361076 filed on Nov. 28, 2000 and No. 2001-278724 filed on Sep. 13, 2001 including the specification, drawings and abstract is incorporated herein by reference in their entireties. The present application is a division of U.S. patent application Ser. No. 12/140,737, filed on Jun. 17, 2008, which is a division of U.S. patent application Ser. No. 09/990,264, filed on Nov. 23, 2001, which is herein incorporated by reference.

BACKGROUND OF THE INVENTION

1. Field of Invention

The invention relates to a fuel cell output characteristic estimation apparatus and an output characteristic estimation method, a fuel cell system and a vehicle having the same, and a fuel cell output control method and a data storage medium that stores a program to implement the method. More particularly, the invention relates to an output characteristic estimation apparatus that estimates an output characteristic of a fuel cell and an output characteristic estimation method for estimating an output characteristic of a fuel cell, a fuel cell system having a fuel cell and a vehicle having the fuel cell system, and a fuel cell output control method for controlling an output of the fuel cell and a data storage medium that stores a computer-readable program that causes a computer to function as a fuel cell output characteristic arithmetic unit and/or a control unit for the fuel cell system.

2. Description of Related Art

There has been proposed a fuel cell system provided with a commercial power supply or other power generating device that supplies electric power to and receives the electric power from the fuel cell in case of short or excessive supply of the output generated by the fuel cell (see, for example, JP-A-3-80316). In this system, when a power consumption of a load is within a predetermined range of the power that can be supplied by the fuel cell, all the power consumption of the load is covered by the power generated by the fuel cell. When the power consumption of the load exceeds the predetermined range, the excessive part of the power requirement is covered by a DC power obtained by rectifying the power supplied by a commercial power supply or other power generating device. As a result, the fuel cell is ensured to be effectively used.

In the aforementioned type of the fuel cell system, however, owing to a change in the output characteristic of the fuel cell as it has been used for an extended period of time, it may happen that the entire power consumption of the load cannot be covered by the fuel cell even when it is determined that the power consumption of the load is within the predetermined range of the power supplied by the fuel cell. An energy efficiency of the fuel cell also changes at different operation points depending on an output characteristic. Therefore, the output characteristic has to be taken into account when an overall energy efficiency of the entire system is considered.

The applicant of the invention has proposed a system that determines a fuel cell output by taking account of the output characteristic of the fuel cell for the purpose of enhancing an energy efficiency of the fuel cell system (see JP-A-2000-12059).

SUMMARY OF THE INVENTION

It is an object of the invention to provide a fuel cell output characteristic estimation apparatus and a fuel cell output characteristic estimation method so as to accurately estimate the output characteristic that is likely to change as the fuel cell has been used for an extended period of time.

It is another object of the invention to provide a fuel cell system and a fuel cell output control method so as to enhance an overall energy efficiency by optimizing the operation of the fuel cell.

It is a further object of the invention to provide a vehicle including the fuel cell system that provides the enhanced energy efficiency.

It is a still further object of the invention to provide a data storage medium that allows a computer to function as a fuel cell output characteristic arithmetic unit for accurately deriving the output characteristic of the fuel cell that varies with time of use, and to function as a control unit for the fuel cell system for enhancing an overall energy efficiency by optimizing the operation of the fuel cell.

A fuel cell output characteristic estimating apparatus for estimating an output characteristic of a fuel cell according to one aspect of the invention includes a current-voltage detector that detects an output current of the fuel cell and a voltage between terminals of the fuel cell, and a controller that estimates the output characteristic of the fuel cell on the basis of the detected output current and the detected voltage between the terminals, detected by the current-voltage detector, and a basic output characteristic of the fuel cell.

The aforementioned fuel cell output characteristic estimation apparatus allows accurate estimation of an output characteristic at a specific timing of a fuel cell that has been used over an extended period of time on the basis of the detected output current, the detected voltage between terminals, and the basic output characteristic of the fuel cell. In this case, the output characteristic of the fuel cell represents a relationship between the output current of the fuel cell and the output voltage of the fuel cell.

In the aforementioned fuel cell output characteristic estimating apparatus, the controller derives the basic output characteristic from at least one of a fuel supply pressure applied to the fuel cell and a temperature of the fuel cell. In this apparatus, the controller derives the basic output characteristic from an output characteristic of the fuel cell corresponding to at least one of the fuel supply pressure applied to the fuel cell and the temperature of the fuel cell, and an internal resistance of the fuel cell corresponding to the temperature of the fuel cell. As a result, the apparatus makes it possible to estimate the output characteristic of the fuel cell more appropriately.

In the aforementioned fuel cell output characteristic estimation apparatus, the controller estimates an internal resistance of the fuel cell on the basis of the detected output current and the detected voltage between the terminals, and the basic output characteristic, and estimates the output characteristic of the fuel cell on the basis of the estimated internal resistance of the fuel cell. This may allow more appropriate estimation of the output characteristic of the fuel. In this apparatus, the controller estimates the output characteristic of the fuel cell on the basis of the output characteristic corresponding to at least one of the fuel supply pressure applied to the fuel cell and the temperature of the fuel cell, and the estimated internal resistance.

According to another aspect of the invention, a fuel cell system having a fuel cell includes a fuel cell output characteristic estimating apparatus for estimating an output characteristic of the fuel cell, including a current-voltage detector that detects an output current of the fuel cell and a voltage between terminals of the fuel cell, and a controller that estimates the output characteristic of the fuel cell on the basis of the detected output current and the detected voltage between the terminals, detected by the current-voltage detector, and a basic output characteristic of the fuel cell; sets a target output of the fuel cell using the output characteristic of the fuel cell estimated by the controller; and adjusts an output of the fuel cell such that the set target output is generated by the fuel cell.

The aforementioned fuel cell system controls the output of the fuel cell using a more optimized fuel cell output characteristic, resulting in an efficient operation of the fuel cell. Accordingly an energy efficiency of the entire system can be enhanced.

The aforementioned fuel cell system includes a power supply that supplies electric power to and receives the electric power from the fuel cell system, in which the controller sets the target output of the fuel cell on the basis of an output required to be generated by the fuel cell system. When the set target output of the fuel cell is in excess of or short of the required output of the fuel cell system, the controller is operable to control (i.e., change) supply of the electric power to or from the power supply. Such arrangement allows the fuel cell system to generate a required amount of electric power while operating the fuel cell efficiently. In the aforementioned fuel cell system, the controller includes a transformer that is connected to terminals of the power supply and transforms the voltage between the terminals of the power supply so as to be applied to output terminals of the fuel cell.

In the aforementioned fuel cell system according to the invention, the controller changes the voltage between the terminals of the fuel cell into a voltage corresponding to the set target output. The use of a more optimized output characteristic of the fuel cell allows the fuel cell to generate a required output by controlling a voltage between terminals of the fuel cell into a voltage corresponding to the required output.

According to another aspect of the invention, a vehicle includes a fuel cell system having a fuel cell output characteristic estimating apparatus for estimating an output characteristic of the fuel cell, including a current-voltage detector that detects an output current of the fuel cell and a voltage between terminals of the fuel cell, and a controller that estimates the output characteristic of the fuel cell on the basis of the detected output current and the detected voltage between the terminals, detected by the current-voltage detector, and a basic output characteristic of the fuel cell. The controller sets a target output of the fuel cell using the output characteristic of the fuel cell estimated by the controller, and adjusts an output of the fuel cell such that the set target output is generated by the fuel cell. Since the fuel cell system uses a more optimized output characteristic of the fuel cell to adjust the output from the fuel cell for the efficient operation of the fuel cell, the vehicle having this type of the fuel cell system may achieve a high energy efficiency.

A method of estimating an output characteristic of a fuel cell according to another aspect of the invention includes the steps of (a) estimating a basic output characteristic of the fuel cell on the basis of at least one of a fuel supply pressure applied to the fuel cell and a temperature of the fuel cell; and (b) estimating the output characteristic of the fuel cell on the basis of the estimated basic output characteristic of the fuel cell, a detected output current of the fuel cell, and a detected voltage between terminals of the fuel cell.

In the aforementioned fuel cell output characteristic estimation method, it is possible to estimate an output characteristic at a specific timing of the fuel cell that has been used over an extended period of time on the basis of the basic output characteristic of the fuel cell obtained from the fuel supply pressure applied to the fuel cell, the temperature of the fuel cell, the detected output current, and the detected voltage between terminals of the fuel cell.

In the aforementioned fuel cell output characteristic estimation method, the basic output characteristic of the fuel cell is estimated using an output characteristic corresponding to at least one of the fuel supply pressure applied to the fuel cell and the temperature of the fuel cell, and an internal resistance of the fuel cell corresponding to the temperature of the fuel cell. This allows the fuel cell output characteristic to be estimated even more appropriately.

In the aforementioned fuel cell output characteristic estimation method, the output characteristic of the fuel cell is estimated using an internal resistance of the fuel cell estimated on the basis of the detected output current, the detected voltage between the terminals of the fuel cell, and the basic output characteristic. This allows the fuel cell output characteristic to be estimated more appropriately. In the aforementioned method, the output characteristic of the fuel cell is estimated using an output characteristic corresponding to at least one of the fuel supply pressure applied to the fuel cell and the temperature of the fuel cell, and the estimated internal resistance of the fuel cell.

A method of controlling an output of a fuel cell according to another aspect of the invention includes the steps of (a) setting a target output using an estimated output characteristic of the fuel cell, wherein the output characteristic of the fuel cell is estimated by the steps of (i) estimating a basic output characteristic of the fuel cell on the basis of at least one of a fuel supply pressure applied to the fuel cell and a temperature of the fuel cell, and (ii) estimating the output characteristic of the fuel cell on the basis of the estimated basic output characteristic of the fuel cell, a detected output current of the fuel cell, and a detected voltage between terminals of the fuel cell; and (b) controlling an output of the fuel cell such that the fuel cell generates the set target output.

According to the aforementioned fuel cell output control method of the invention, even more optimized output characteristic of the fuel cell is estimated and the output of the fuel cell is controlled by using the estimated output characteristic, which allows the fuel cell to be operated efficiently.

In the aforementioned fuel cell output control method, a target output is set on the basis of an output required to be generated by a fuel cell system including a power supply that supplies electric power to and receives the electric power from the fuel cell system, and when the set target output of the fuel cell is in excess of or short of the required output of the fuel cell system, supply of the electric power to or from the power supply is changed. This allows the fuel cell system to generate an output corresponding to an output requirement for the fuel cell system, while operating the fuel cell efficiently. In the fuel cell output control method, a voltage between the terminals of the power supply connected to output terminals of the fuel cell is transformed such that the voltage between the terminals of the fuel cell becomes a voltage corresponding to the target output.

According to another aspect of the invention, a data storage medium that stores a computer readable program that causes a computer to function as a controller for computing an output characteristic of a fuel cell includes a computing program that derives a basic output characteristic of the fuel cell on the basis of at least one of a fuel supply pressure applied to the fuel cell and a temperature of the fuel cell; and derives the output characteristic of the fuel cell on the basis of the derived basic output characteristic of the fuel cell, a detected output current of the fuel cell, and a detected voltage between terminals of the fuel cell.

The aforementioned data storage medium allows a computer to serve as a fuel cell output characteristic arithmetic unit that is capable of computing the output characteristic at a specific timing of a fuel cell which has been used for an extended period of time, on the basis of the detected output current, the detected voltage between terminals of the fuel cell, and the fuel cell basic output characteristic.

In the aforementioned data storage medium, the computing program derives the basic output characteristic using an output characteristic corresponding to at least one of the fuel supply pressure applied to the fuel cell and the temperature of the fuel cell, and an internal resistance of the fuel cell corresponding to the temperature of the fuel cell In the aforementioned data storage medium, the computing program estimates the output characteristic of the fuel cell using an internal resistance of the fuel cell estimated on the basis of the detected output current, the detected voltage between the terminals of the fuel cell, and the basic output characteristic. In this data storage medium, the computing program derives the output characteristic of the fuel cell using an output characteristic corresponding to at least one of the fuel supply pressure applied to the fuel cell and the temperature of the fuel cell, and the estimated internal resistance.

According to another aspect of the invention, a data storage medium that stores a computer readable program that causes a computer to function as a device for controlling a fuel cell includes a computing program that derives a basic output characteristic of the fuel cell on the basis of at least one of a fuel supply pressure applied to the fuel cell and a temperature of the fuel cell; derives the output characteristic of the fuel cell on the basis of the derived basic output characteristic of the fuel cell, a detected output current of the fuel cell, and a detected voltage between terminals of the fuel cell; sets a target output of the fuel cell using the derived output characteristic of the fuel cell; and controls the output of the fuel cell such that the fuel cell generates the set target output.

The aforementioned data storage medium allows the computer to serve as a control unit for the fuel cell system for controlling the output of the fuel cell using more optimized fuel cell output characteristic so as to operate the fuel cell efficiently.

In the aforementioned data storage medium, the computing program sets the target output on the basis of the output required to be generated by the fuel cell system including the power supply that supplies electric power to and receives the electric power from the fuel cell, and to change the supply of the electric power to or from the power supply when the set target output of the fuel cell is in excess of or short of the required output of the fuel cell system. In this data storage medium, the computing program can cause the transformation of the voltage between the terminals of the power supply connected to the output terminals of the fuel cell such that the voltage between terminals of the fuel cell becomes a voltage corresponding to the set target output.

BRIEF DESCRIPTION OF THE DRAWINGS

The above and other objects, features, advantages and technical and industrial significance of the present invention will be better understood by reading the following detailed description of an exemplary preferred embodiment of the invention, when considered in connection with the accompanying drawings in which.

DETAILED DESCRIPTION OF PREFERRED EMBODIMENTS

Figure 1:
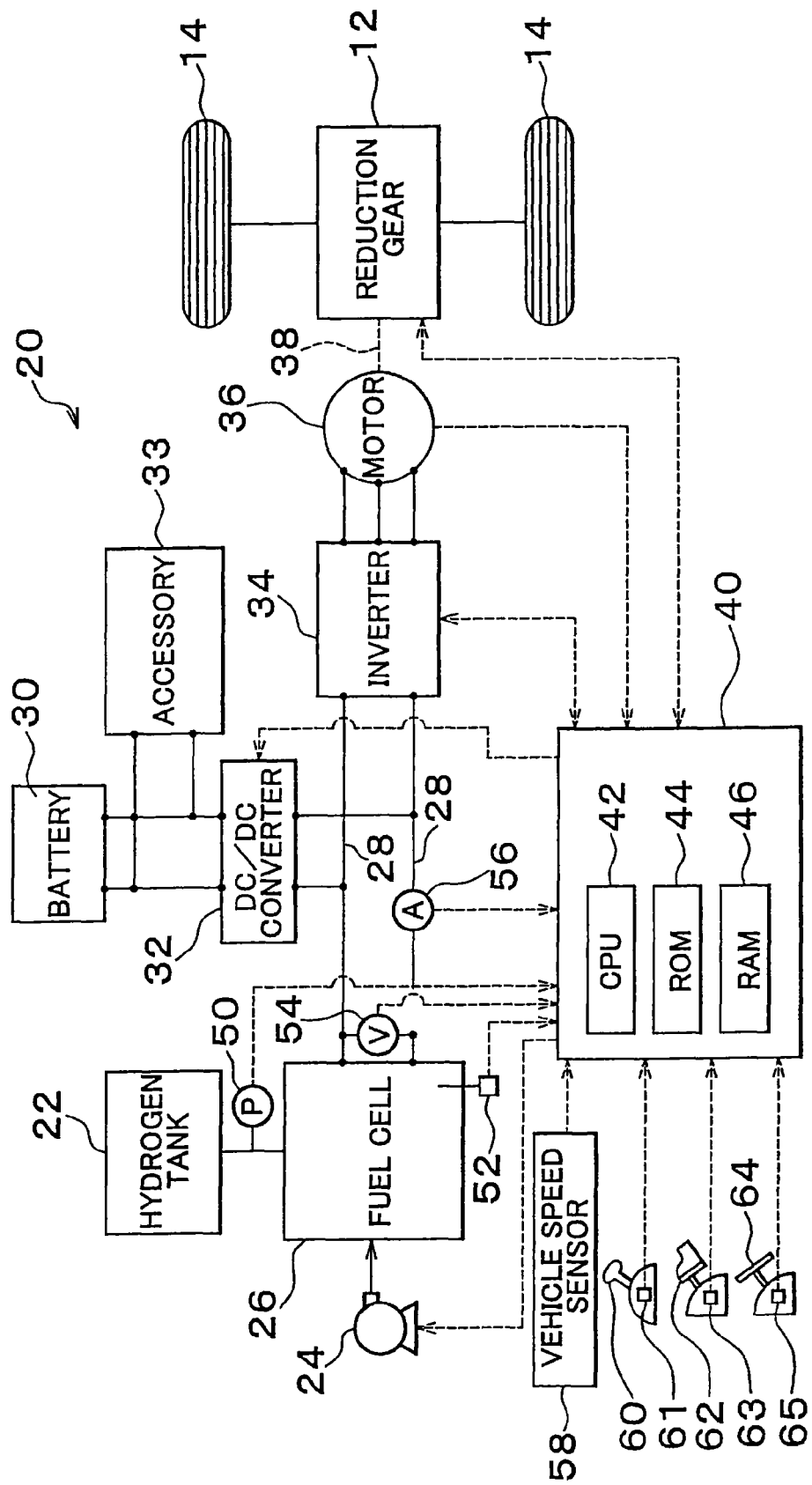
FIG. 1 is a block diagram showing a schematic configuration of a fuel cell system mounted on a vehicle according to an embodiment of the invention.

An exemplary embodiment of the invention will be explained hereinafter. FIG. 1 is a block diagram showing a schematic configuration of a fuel cell system 20 installed in a vehicle according to one embodiment of the invention. Referring to FIG. 1, the fuel cell system 20 according to the embodiment is provided with a fuel cell 26 constructed, for example, as a polymer electrolyte fuel cell, that generates power using hydrogen supplied by a hydrogen tank 22 and oxygen contained in an air supplied by a blower 24, a DC/DC converter 32 that regulates a voltage of a power line 28 connected to an output terminal of the fuel cell 26 and charges/discharges a battery 30 supplying power to an accessory 33, an inverter 34 that is connected to the power line 28, a motor 36 that is driven through switching of a switching device of an inverter 34 to provide a driving power from a driving shaft 38, and an electronic control unit (ECU) 40 that controls the entire system. The driving shaft 38 is connected through a reduction gear 12 to driving wheels 14 of a vehicle, and the driving power output from the motor 36 to the driving shaft 38 will eventually be output to the driving wheels 14.

The ECU 40 is a microprocessor including a CPU 42, ROM 44 that stores processing programs, RAM 46 that temporarily stores data, and an I/O port (not shown). Data input to the ECU 40 through the input port include a hydrogen supply pressure Ph detected by a pressure sensor 50 mounted to a supply pipe from the hydrogen tank 22 to the fuel cell 26, a fuel cell temperature Tfc detected by a temperature sensor 52 mounted on the fuel cell 26, an output voltage Vfc from the fuel cell 26 detected by a voltage sensor 54 mounted across output terminals of the fuel cell 26, an output current Ifc of the fuel cell 26 detected by a current sensor 56 mounted on an output terminal of the fuel cell 26, a current of each phase applied to the motor 26 detected by a current sensor (not shown) mounted in the inverter 34, an angle of revolution of a rotor of the motor 36 detected by an angle sensor (not shown) mounted on the motor 36, a vehicle speed V detected by a vehicle speed sensor 58, a shift position SP detected by a shift position sensor 61 that detects a position of a shift lever 60, an accelerator pedal position AP detected by an accelerator position sensor 63 that detects an amount by which an accelerator pedal 62 is depressed, and a brake pedal position BP detected by a brake pedal position sensor 65 that detects an amount by which a brake pedal 64 is depressed. Meanwhile, signals output from the ECU 40 through the output port, on the other hand, include a driving signal for the blower 24, a control signal for the DC/DC converter 32, a control signal for the inverter 34, and a control signal for the reduction gear 12.

The operation of the fuel cell system 20 according to this exemplary embodiment of the invention, especially the operation for estimating the output characteristic of the fuel cell 26 and the operation for output control, will be explained. The operation for estimating the output characteristic of the fuel cell 26 will be explained referring to a flowchart of FIG. 2. This flowchart illustrates a typical output characteristic estimation process routine representing how the output characteristic of the fuel cell 26 is estimated. FIG. 3 is a flowchart showing a typical output characteristic correction process routine executed by the ECU 40 for the fuel cell system 20 according to the embodiment. The output characteristic estimation process routine shown in FIG. 2 is executed by the ECU 40 of the fuel cell system 20 not only when the output characteristic is estimated but also when the fuel cell temperature Tfc or the hydrogen supply pressure Ph changes.

Figure 2:
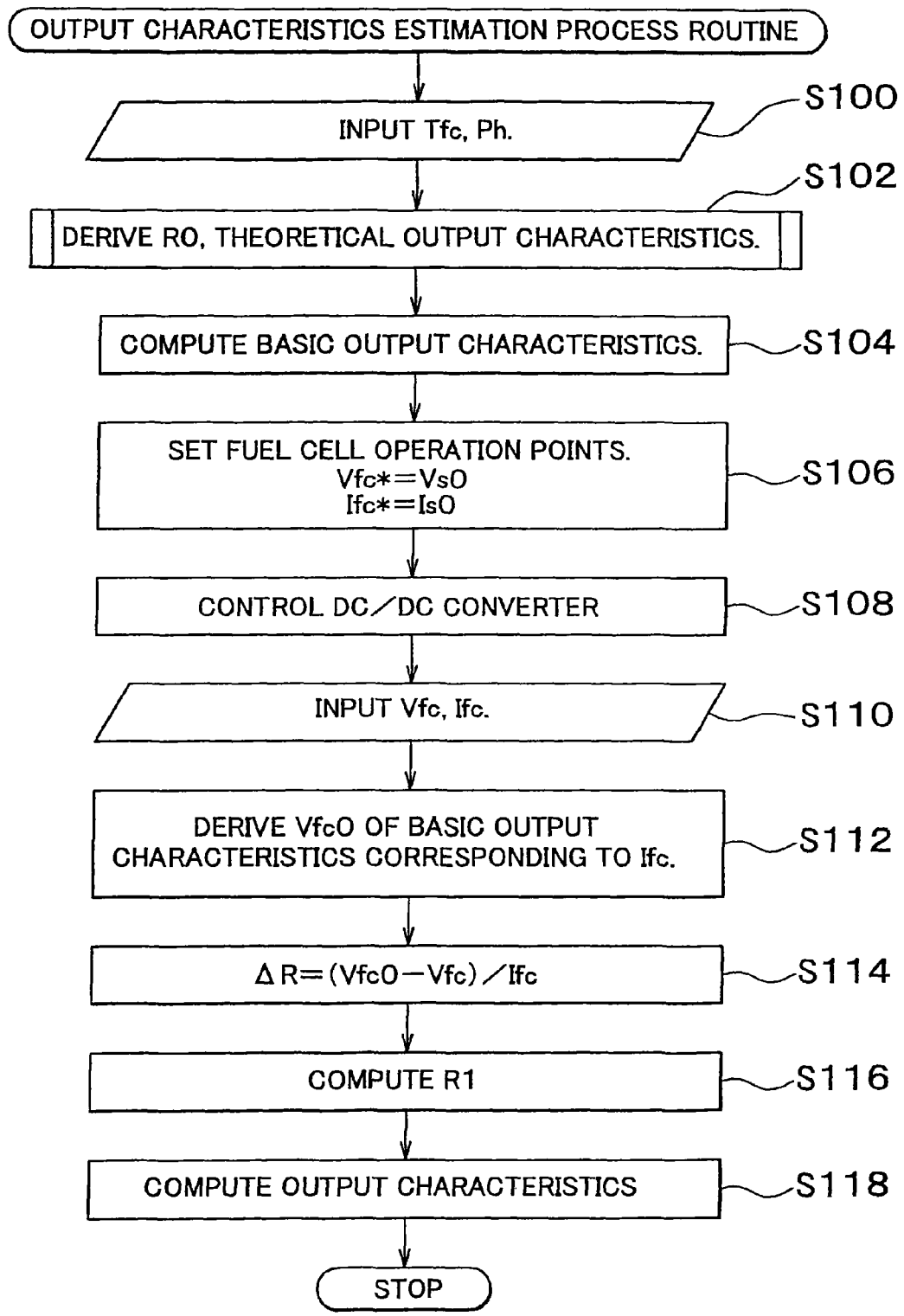
FIG. 2 is a flowchart showing a typical output characteristic estimation process routine explaining how the output characteristic of the fuel cell is estimated.
Figure 3:
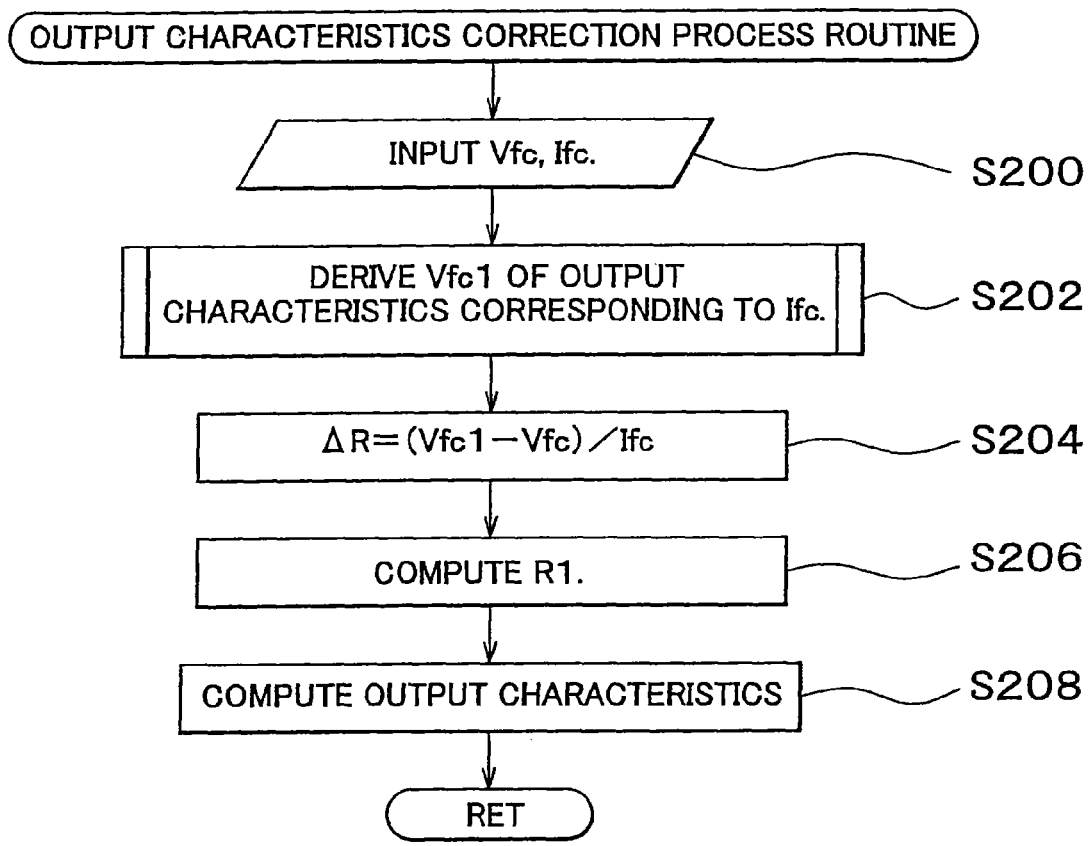
FIG. 3 is a flowchart showing a typical output characteristic correction process routine executed by an electronic control unit for the fuel cell system according to an embodiment of the invention.
Figure 4:
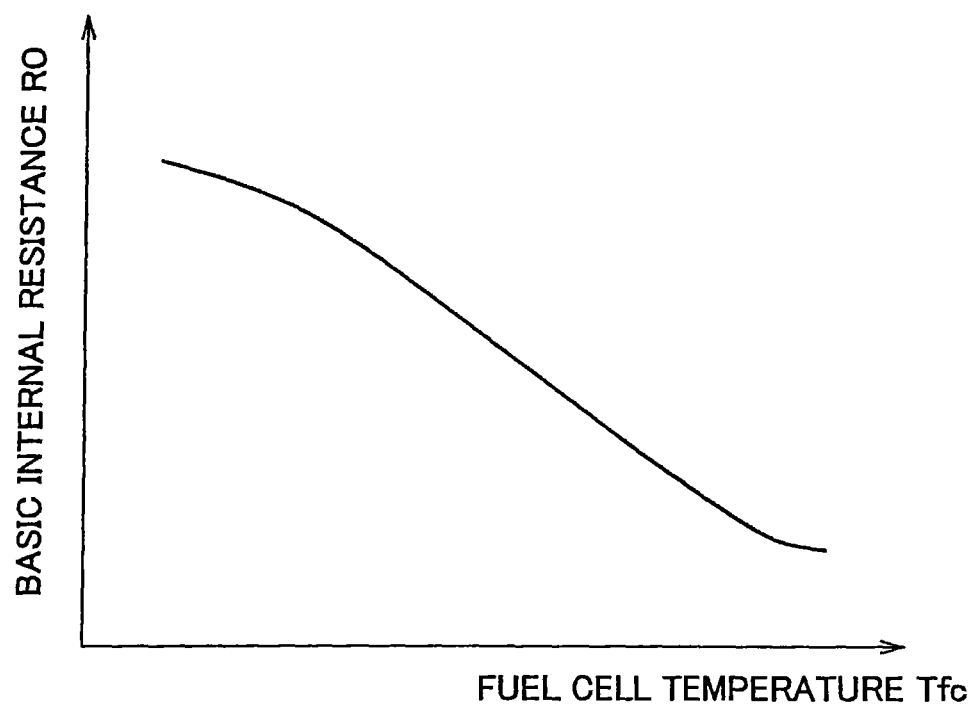
FIG. 4 is a typical map showing a relationship between a fuel cell temperature Tfc and a basic internal resistance R0.
Figure 5:
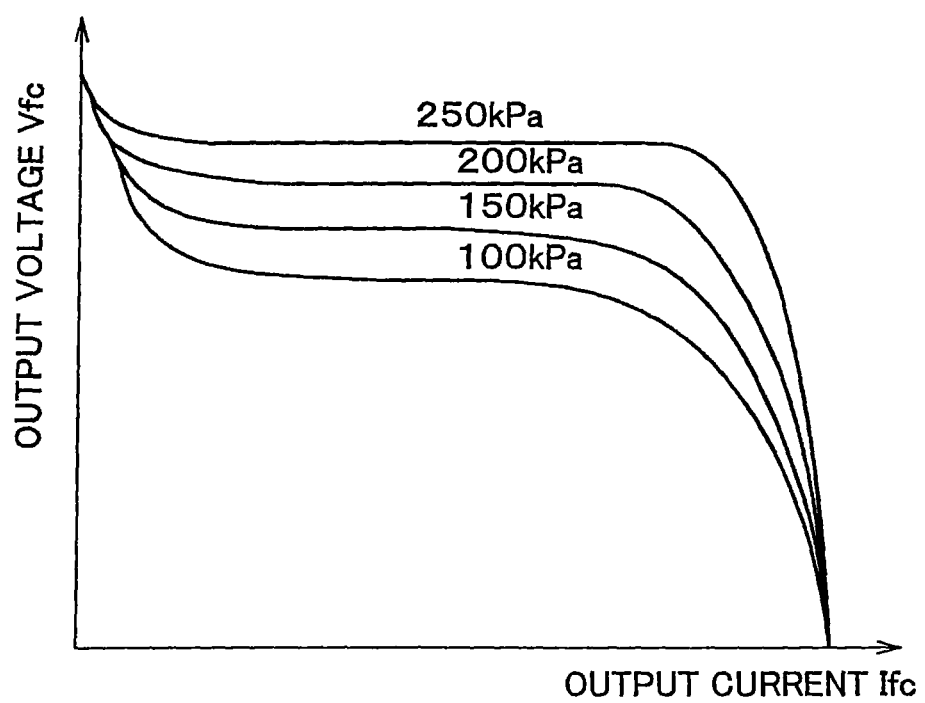
FIG. 5 is a typical map showing a relationship between an output current Ifc and an output voltage Vfc of the fuel cell at varied hydrogen supply pressures Ph applied to the fuel cell with no internal resistance.

Upon execution of the output characteristic estimation process routine shown in FIG. 2, in step S100, the CPU 42 of the ECU 40 reads the hydrogen supply pressure Ph detected by the pressure sensor 50 and the fuel cell temperature Tfc detected by the temperature sensor 52. Then in step S102, a basic internal resistance R0 of the fuel cell 26 and a theoretical output characteristic are derived. In this embodiment, the basic internal resistance R0 is derived from a map stored in the ROM 44, in which an experimentally obtained relationship between the fuel cell temperature Tfc and the basic internal resistance R0 is preliminarily stored. When the fuel cell temperature Tfc is given, the basic internal resistance R0 can be derived in relation with the given value of the fuel cell temperature Tfc in the map. FIG. 4 shows an example of the map representing a relationship between the fuel cell temperature Tfc and the basic internal resistance R0. In this embodiment, a map representing a relationship between output current Ifc and output voltage Vfc of the fuel cell 26 with no internal resistance at each hydrogen supply pressure Ph is preliminarily stored in the ROM 44. The theoretical output characteristic is derived as the relationship between the output current Ifc and the output voltage Vfc from the map by referring to the given value of the hydrogen supply pressure Ph. FIG. 5 is an example of the map showing the relationship between the output current Ifc and the output voltage Vfc of the fuel cell 26 at varied hydrogen supply pressures Ph applied to the fuel cell 26.

When the basic internal resistance R0 and the theoretical output characteristic are derived in step S102, the program proceeds to step S104. In step S104, a basic output characteristic is computed using the derived basic internal resistance R0 and the theoretical output characteristic. The basic output characteristic is computed by incorporating the basic internal resistance R0 into the theoretical output characteristic. The basic output characteristic can be obtained by the following equation (1).

$$V1 = V0 - R0 \cdot I \qquad (1)$$

where V0 represents the output voltage of the theoretical output characteristic corresponding to an output current I, and V1 represents the output voltage of the basic output characteristic corresponding to the output current I.

In step S106, specific points Vs0, Is0 on the obtained basic output characteristic are set as operation points Vfc*, Ifc* of the fuel cell 26. In step S108, the DC/DC converter 32 is controlled such that the fuel cell 26 is operated at the operation points set in step S106. More specifically, the DC/DC converter 32 is controlled to adjust the voltage of the power line 28 to the voltage at the operation point Vfc*.

Figure 6:
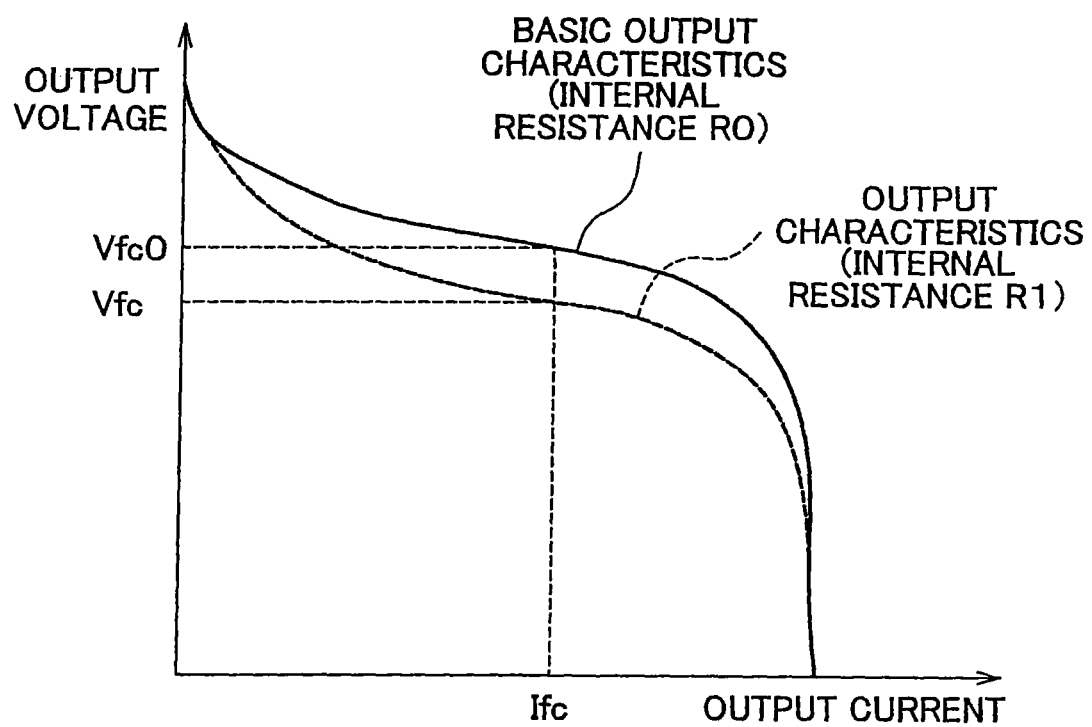
FIG. 6 is an explanatory view showing a typical process of obtaining the output characteristic of the fuel cell from the basic output characteristic.

In step S110, the output voltage Vfc detected by the voltage sensor 54 and the output current Ifc detected by the current sensor 56 are read. Then in step S112, the output current Ifc read in step S110 and the basic output characteristic obtained through computation in step S104 are used to derive an output voltage Vfc0 on the basic output characteristic corresponding to the output current Ifc. In step S114, a deviation between the output voltage Vfc0 on the basic output characteristic and the output voltage Vfc detected by the voltage sensor 54 is divided by the output current Ifc to obtain the internal resistance deviation ΔR. In step S116, the internal resistance deviation ΔR is added to the basic internal resistance R0 to obtain an internal resistance R1 of the fuel cell 26. In step S118, the output characteristic of the fuel cell 26 is derived from the following equation (2) using the internal resistance R1 calculated in step S116. In the equation, V2 is the output voltage of the output characteristic of the fuel cell 26 corresponding to the output current I. FIG. 6 shows a typical process of obtaining the output characteristic of the fuel cell 26 from the basic output characteristic.

$$V2 = V0 - R1 \cdot I \qquad (2)$$

In the fuel cell system 20 according to the embodiment, in case of no change in the fuel cell temperature Tfc or the hydrogen supply pressure Ph, the output characteristic estimation process routine as exemplified in the flowchart of FIG. 2 is executed. Then an output characteristic correction process routine, as exemplified in the flowchart of FIG. 3, is repeatedly executed to correct the output characteristic of the fuel cell 26. The aforementioned correction routine corresponds basically to the control scheme from step S110 to S118 of the flowchart as shown in FIG. 2. The output characteristic correction process is different from the control scheme of the output characteristic estimating routine in that the previous output characteristic is used (S202 in FIG. 3) instead of using the basic output characteristic (S112 in FIG. 2) and the internal resistance R1 is derived from a proportional term and an integral term (S206 in FIG. 3).

Upon start of the output characteristic correction process routine, the CPU 42 of the ECU 40 reads the output voltage Vfc detected by the voltage sensor 54 and the output current Ifc detected by the current sensor 56 in step S200. In step S202, the output current Ifc read in step S200 and the output characteristic of the fuel cell 26 obtained through computation executed in the previous cycle are used to derive an output voltage Vfc1 on the output characteristic corresponding to the output current Ifc. Then in step S204, a deviation between the output voltage Vfc1 on the output characteristic and the output voltage Vfc is divided by the output current Ifc to obtain the internal resistance deviation ΔR. In step S206, the internal resistance R1 of the fuel cell 26 is computed using the following equation (3).

$$R1 = R0 + Kp\Delta R + Ki\int \Delta R dt \quad (3)$$

where Kp is a gain in the proportional term and Ki is a gain in the integral term.

Figure 7:
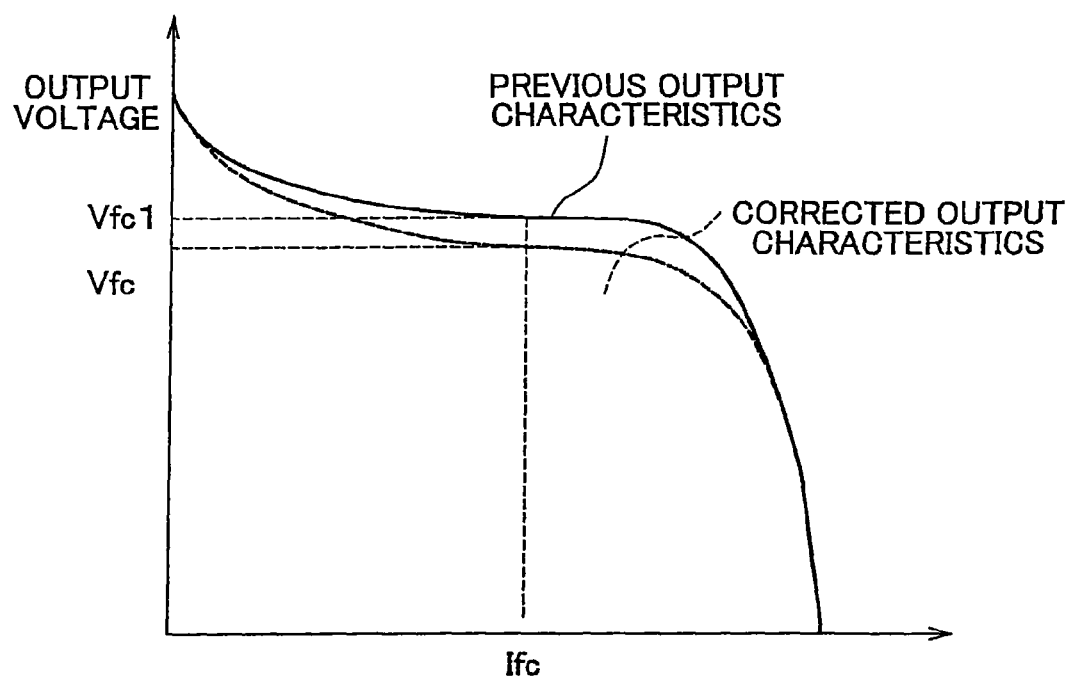
FIG. 7 is an explanatory view showing a typical process of correcting the output characteristic of the fuel cell.

Then in step S208, the output characteristic of the fuel cell 26 is derived from the equation (2) using the internal resistance R1, and the process returns. FIG. 7 shows an example of correction of the output characteristic of the fuel cell 26.

In the fuel cell system 20 according to the embodiment, the output characteristic estimation process and the output characteristic correction process executed by the ECU 40 may provide more accurate output characteristic of the fuel cell 26 that has been used over an extended period of time.

Figure 8:
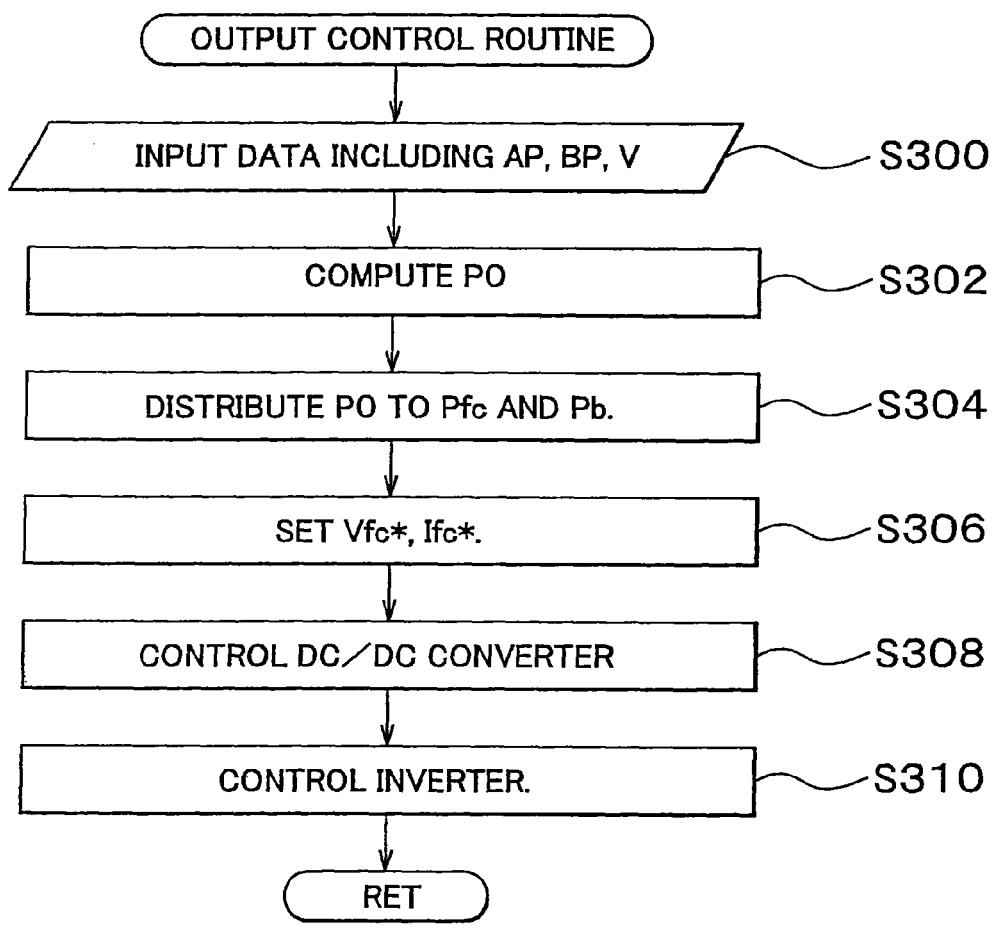
FIG. 8 is a flowchart showing a typical output control routine executed by the electronic control unit for the fuel cell system according to an embodiment of the invention.

In the fuel cell system 20 according to the embodiment, the obtained output characteristic of the fuel cell 26 is used to execute an output control of the system. FIG. 8 is a flowchart showing a typical output control routine executed by the ECU 40 for the fuel cell system 20 according to the embodiment. This routine is executed repeatedly at a predetermined time interval (for example, at every 8 msec.).

Upon execution of the output control routine, in step S300, the CPU 42 of the ECU 40 reads various data including a vehicle speed V detected by the vehicle speed sensor 58, an accelerator pedal position AP detected by the accelerator pedal position sensor 63, and a brake pedal position BP detected by the brake pedal position sensor 65. Then in step S302, a value of an output to be supplied to the driving shaft 38, namely, output requirement P0 for the system is computed on the basis of the data including the accelerator pedal position AP, the brake pedal position BP, and the vehicle speed V that have been read in step S300. In this embodiment, a map containing the relationship between the output requirement P0 and the data including the accelerator pedal position AP, the brake pedal position BP, and the vehicle speed V is stored in the ROM 44. The output requirement P0 can be derived from the map in accordance with a given value of the data including the accelerator pedal position AP, brake pedal position BP, and the vehicle speed V in relation with the output requirement P0.

When the output requirement P0 is obtained in step S302, the process proceeds to step S304. In step S304, the output requirement P0 is distributed to a fuel cell output Pfc generated by the fuel cell 26 and a battery output Pb generated by a battery 30. More specifically, the fuel cell output Pfc is set to allow efficient operation of the fuel cell 26 within its output range using the output characteristic estimated by the output characteristic estimating process routine shown in FIG. 2 or corrected by the output characteristic correcting process routine shown in FIG. 3. Then the battery output Pb is set to cover the short or excessive supply of the output of the Pfc.

After distributing the output requirement P0 in step S304, the process proceeds to step S306. In step S306, the operation points Vfc*, Ifc* of the fuel cell 26 are set on the basis of the fuel cell output Pfc. Then in step S308, the DC/DC converter 32 is controlled such that the voltage of the power line 28 reaches the operation point voltage Vfc*. In step S310, the inverter 34 is controlled such that the output requirement P0 is supplied from the motor 36 to the driving shaft 38, and the process returns. Since the inverter 34 is controlled in accordance with a general process, the detailed description of such control, thus, is omitted.

In the fuel cell system 20 of the embodiment described above, the fuel cell output Pfc is distributed on the basis of a more accurate output characteristic of the fuel cell 26. Accordingly, the fuel cell 26 can be efficiently operated, improving energy efficiency of the entire system. Moreover, a short or an excessive supply of the fuel cell output Pfc is covered by the output Pb generated by the battery 30 such that the output requirement P0 is supplied to the driving shaft 38.

Figure 9:
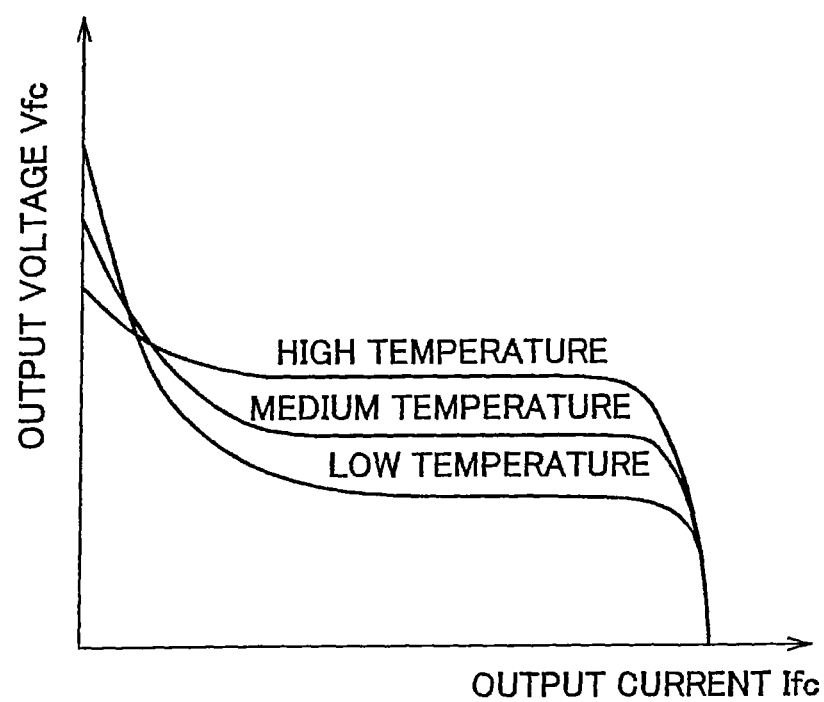
FIG. 9 is a typical map showing a relationship between the output current Ifc and the output voltage Vfc of the fuel cell at varied fuel cell temperatures Tfc of the fuel cell.

In the fuel cell system 20 according to the embodiment, the theoretical output characteristic is derived from the hydrogen supply pressure Ph. It is also possible to derive the theoretical output characteristic from the fuel cell temperature Tfc. In this case, instead of executing step S102 of the flowchart of FIG. 2, a map containing the output current Ifc and the output voltage Vfc of the fuel cell 26 with no internal resistance at varied temperatures Tfc of the fuel cell 26 is stored in the ROM 44. Then a theoretical output characteristic representing the relationship between the output current Ifc and the output voltage Vfc is derived from a given value of the fuel cell temperature Tfc. FIG. 9 is an example of the map showing a relationship between the output current Ifc and the output voltage Vfc of the fuel cell 26 having no internal resistance at varied fuel cell temperatures Tfc.

Figure 10:
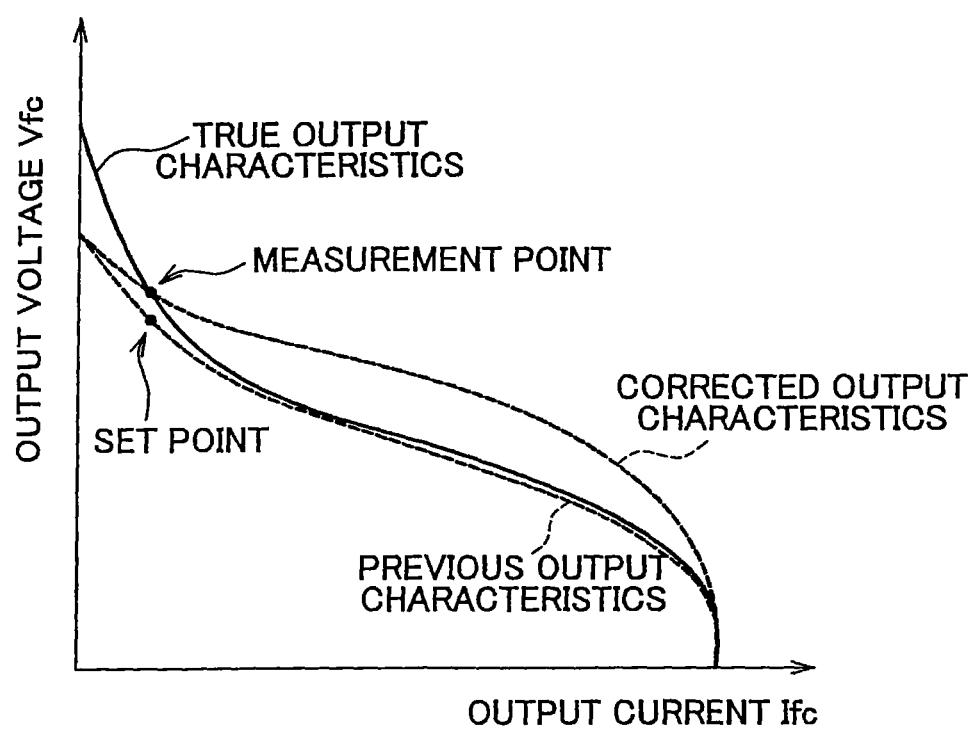
FIG. 10 is an explanatory view showing a typical process of correcting the output characteristic of the fuel cell when a fuel cell output Pfc is low.

The theoretical output characteristic may be derived from the fuel cell temperature Tfc because an accurate theoretical output characteristic can be obtained by using the fuel cell temperature Tfc even in the low output range with reduced error (range at a high output voltage and low output current). FIG. 10 shows an output characteristic estimated on the basis of a theoretical output characteristic derived from the hydrogen supply pressure Ph (dashed line indicated as previous output characteristic), and output characteristic (dashed line indicated as corrected output characteristic) obtained through the routine shown in FIG. 2 or FIG. 3 on the basis of the output voltage Vfc detected by the voltage sensor 54 and the output current Ifc detected by the current sensor 56 (at a measurement point shown in FIG. 10) during operation of the fuel cell 26 in the low output range (at a set point shown in FIG. 10) on the previous output characteristic. As FIG. 10 clearly shows, the corrected output characteristic line deviates from the line representing a true output characteristic shown by a solid line in FIG. 10. In the case where the output characteristic of the fuel cell 26 is derived on the basis of the output voltage Vfc and the output current Ifc during its operation in the low output range using the theoretical output characteristic derived from the hydrogen supply pressure Ph, it is possible to cause the resultant output characteristic to remarkably deviate from the true output characteristic. Meanwhile in the modified example, the theoretical output characteristic with high accuracy can be derived from the fuel cell temperature Tfc even in the low output range. Accordingly, even when the fuel cell 26 is operated in the low output range, the resultant output characteristic may become closer to the true output characteristic. In case of deriving the theoretical output characteristic from the fuel cell temperature Tfc, an input of the hydrogen supply pressure Ph is not necessary in step S100 of the routine shown in FIG. 2.

Figure 11A:
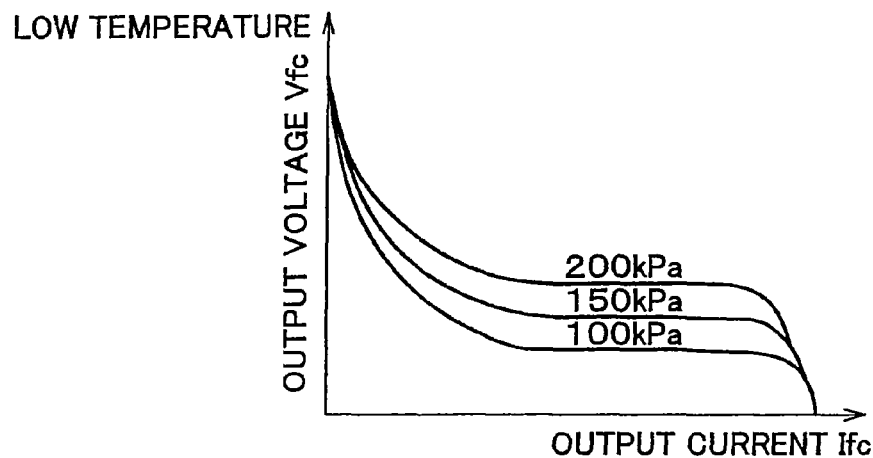
FIGS. 11A through 11C are maps each showing a relationship between the output current Ifc and the output voltage Vfc of the fuel cell with no internal resistance at varied fuel cell temperatures Tfc and varied hydrogen supply pressures Ph applied to the fuel cell, respectively.
Figure 11B:
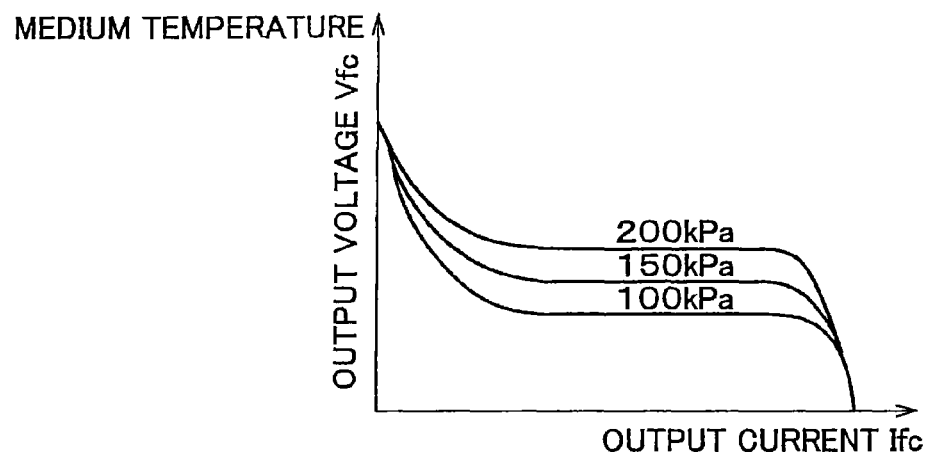
Figure 11C:
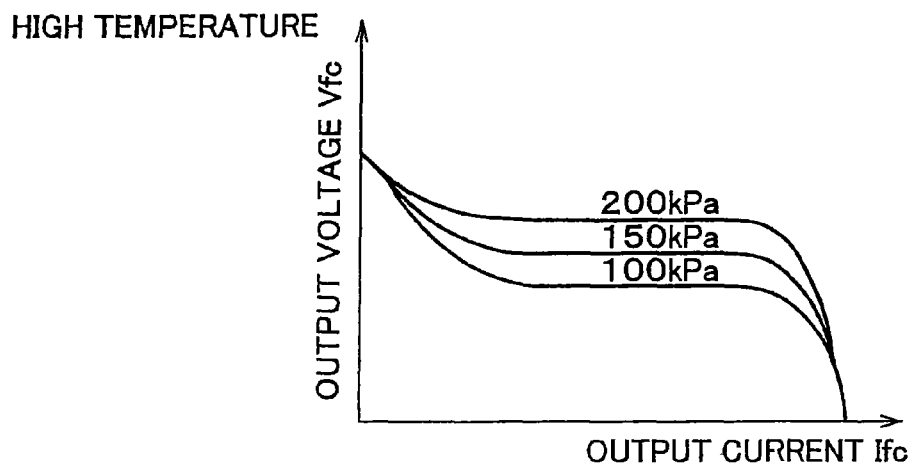

In the foregoing modified example, the theoretical output characteristic is derived from the fuel cell temperature Tfc. It is also possible to derive the theoretical output characteristic using the hydrogen supply pressure Ph and the fuel cell temperature Tfc. In this case, instead of deriving the theoretical output characteristic executed in step S102 of FIG. 2, a map containing a relationship between the output current Ifc and the output voltage Vfc of the fuel cell 26 with no internal resistance at varied fuel cell temperatures Tfc and varied hydrogen supply pressures Ph is stored in the ROM 44. Then the theoretical output characteristic represented by the relationship between the output current Ifc and the output voltage Vfc in the map can be derived from given values of the fuel cell temperature Tfc and the hydrogen supply pressure Ph. FIGS. 11A to 11C show examples of maps representing a relationship between the output current Ifc and the output voltage Vcf of the fuel cell 26 with no internal resistance at the respective fuel cell temperatures Tfc and the respective hydrogen supply pressures Ph.

In this embodiment, the basic internal resistance R0 is derived from the fuel cell temperature Tfc and, at the same time, the theoretical output characteristic taking into account no internal resistance is derived from the hydrogen supply pressure Ph in the fuel cell system 20. However, it is still possible to derive the theoretical output characteristic from the hydrogen supply pressure Ph taking into account a predetermined internal resistance. Likewise, in the modified example of the fuel cell system 20, the basic internal resistance R0 is derived from the fuel cell temperature Tfc and, at the same time, the theoretical output characteristic taking into account no internal resistance is derived from the fuel cell temperature Tfc. Alternatively the basic internal resistance R0 is derived from the fuel cell temperature Tfc and, at the same time, the theoretical output characteristic taking into account no internal resistance is derived from the fuel cell temperature Tfc and the hydrogen supply pressure Ph. In each of these embodiments, it is possible to derive the theoretical output characteristic taking into account a predetermined internal resistance from the fuel cell temperature Tfc and to derive the theoretical output characteristic taking into account a predetermined internal resistance from the hydrogen supply pressure Ph and the fuel cell temperature Tfc.

In the fuel cell system 20 according to the embodiment, the output characteristic estimation process routine shown in FIG. 2 is executed when the fuel cell temperature Tfc or the hydrogen supply pressure Ph changes and the output characteristic correction process routine shown in FIG. 3 is repeatedly executed thereafter. It is again possible to repeatedly execute the output characteristic estimation process routine shown in FIG. 2 irrespective of the change in the fuel cell temperature Tfc or the hydrogen supply pressure Ph. In this case, execution of the output characteristic correction process routine shown in FIG. 3 may or may not be executed.

In the embodiment, the fuel cell system 20 is structured so as to be installed in a vehicle. It is possible that the fuel cell system 20 is employed in a ship, aircraft, or other movable object other than the vehicle, or a freestanding power drive apparatus.

In the embodiment, the fuel cell system 20 estimates or corrects output characteristic of the fuel cell 26 as a source of driving the motor 36. It is possible to apply the embodiment to a system that estimates or corrects output characteristic of a fuel cell functioning as a power source for supplying power to a general load that consumes electric power. In addition, it is preferable that the embodiment be applied to a computer-readable data storage medium that stores a program that causes a computer to serve as an output characteristic estimating apparatus or an output characteristic correction apparatus that performs output characteristic estimation processes or output characteristic correction processes for the fuel cell. The recording medium can be, for example, CD-ROMs and flexible disks. The recording medium can be readily removable, as are the previously noted examples, or fixed, such as with a hard drive or a computer chip. Use of such a data storage medium permits the same effects as those derived from the invention to be obtained by installing a program according to the embodiment of the invention in a fuel cell system.

In the illustrated embodiment, the controller (ECU 40) is implemented as a programmed general purpose computer. It will be appreciated by those skilled in the art that the controller can be implemented using a single special purpose integrated circuit (e.g., ASIC) having a main or central processor section for overall, system-level control, and separate sections dedicated to performing various different specific computations, functions and other processes under control of the central processor section. The controller can be a plurality of separate dedicated or programmable integrated or other electronic circuits or devices (e.g., hardwired electronic or logic circuits such as discrete element circuits, or programmable logic devices such as PLDs, PLAs, PALs or the like). The controller can be implemented using a suitably programmed general purpose computer, e.g., a microprocessor, microcontroller or other processor device (CPU or MPU), either alone or in conjunction with one or more peripheral (e.g., integrated circuit) data and signal processing devices. In general, any device or assembly of devices on which a finite state machine capable of implementing the procedures described herein can be used as the controller. A distributed processing architecture can be used for maximum data/signal processing capability and speed.

While the invention has been described with reference to preferred embodiments thereof, it is to be understood that the invention is not limited to the preferred embodiments or constructions. To the contrary, the invention is intended to cover various modifications and equivalent arrangements. In addition, while the various elements of the preferred embodiments are shown in various combinations and configurations, which are exemplary, other combinations and configurations, including more, less or only a single element, are also within the spirit and scope of the invention.

What is claimed:

1. A fuel cell system having a fuel cell whose output characteristic has undergone a change over time, the fuel cell system comprising:

a fuel cell output characteristic estimating apparatus that estimates an output characteristic of the fuel cell after the output characteristic has undergone a change over time, including a current-voltage detector that detects an output current of the fuel cell and a voltage between terminals of the fuel cell, and a controller that is configured to:

estimate the output characteristic of the fuel cell after the output characteristic has undergone a change over time, the estimation being made after the output characteristic has undergone a change over time, the estimation being made on the basis of the detected output current and the detected voltage between the terminals, detected by the current-voltage detector, and a basic output characteristic of the fuel cell which is a characteristic voltage determined based on an internal resistance of the fuel cell calculated from a fuel cell temperature and a theoretical voltage based on a hydrogen supply pressure;

set a target output of the fuel cell using the output characteristic of the fuel cell estimated by the controller;

adjust an output of the fuel cell such that the set target output is generated by the fuel cell; and correct the basic output characteristic of the fuel cell based on the detected output current and the detected output voltage of the fuel cell;

a power supply that supplies electric power to, and receives the electric power from, the fuel cell system; and a converter connected to terminals of the power supply and that transforms the voltage between the terminals of the power supply so as to be applied to the terminals of the fuel cell, wherein the controller corrects the basic output characteristic of the fuel cell by determining a voltage deviation between the detected output voltage and the characteristic voltage, and the controller sets the target output of the fuel cell on the basis of an output required to be generated by the fuel cell system, and when the set target output of the fuel cell is in excess of, or short of, the required output of the fuel cell system, the controller changes supply of the electric power to or from the power supply.

2. The fuel cell system according to claim 1, wherein the controller changes the voltage between the terminals of the fuel cell into a voltage corresponding to the set target output.

3. The fuel cell according to claim 1, wherein the controller calculates an internal resistance deviation based on the voltage deviation and the detected output current.

4. The fuel cell according to claim 3, wherein the controller calculates a corrected internal resistance by adding the internal resistance deviation and the internal resistance of the fuel cell.

5. The fuel cell according to claim 4, wherein the controller calculates a corrected output characteristic of the fuel cell based on the corrected internal resistance.

6. The fuel cell according to claim 1, wherein the controller estimates the output characteristic the fuel cell when the fuel cell temperature or the hydrogen supply pressure changes.

* * * * *